United States Patent [19]
Orr

[11] 4,208,703
[45] Jun. 17, 1980

[54] DEVICE HOLDER

[76] Inventor: Allie E. Orr, 4412 Culpepper Cir., Louisville, Ky. 40222

[21] Appl. No.: 879,851

[22] Filed: Feb. 22, 1978

[51] Int. Cl.² ............................................. A21V 33/00
[52] U.S. Cl. .................................... 362/287; 362/109; 362/190; 362/322; 362/421; 362/427
[58] Field of Search ............... 362/149, 190, 109, 287, 362/322–324, 372, 421, 426, 427, 429, 447; 248/166, 168, 170, 434, 439

[56] References Cited
U.S. PATENT DOCUMENTS

| | | | |
|---|---|---|---|
| 1,324,605 | 12/1919 | McKinney | 248/168 |
| 1,863,756 | 6/1932 | Lufkin | 248/170 |
| 2,706,610 | 4/1955 | Roberts | 248/168 |
| 3,334,849 | 8/1967 | Bronder | 248/168 X |
| 3,341,159 | 9/1967 | Franssen | 248/166 X |
| 3,716,211 | 2/1973 | Butz | 248/168 |
| 4,036,462 | 7/1977 | Sheftel | 248/166 X |
| 4,135,691 | 1/1979 | Wiesmann | 248/439 X |

*Primary Examiner*—Peter A. Nelson
*Attorney, Agent, or Firm*—Donald L. Cox

[57] ABSTRACT

There is disclosed a device for holding, for example, illuminating devices, which comprises a barrel having on one end a tubular split shaft housing, said housing being provided with cam means; a bottom leg having a center shaft housing engageable concentrically with the split shaft housing; and a center shaft inserted through the split shaft housing having attached to either end leg receivers for engagement with side legs.

8 Claims, 20 Drawing Figures

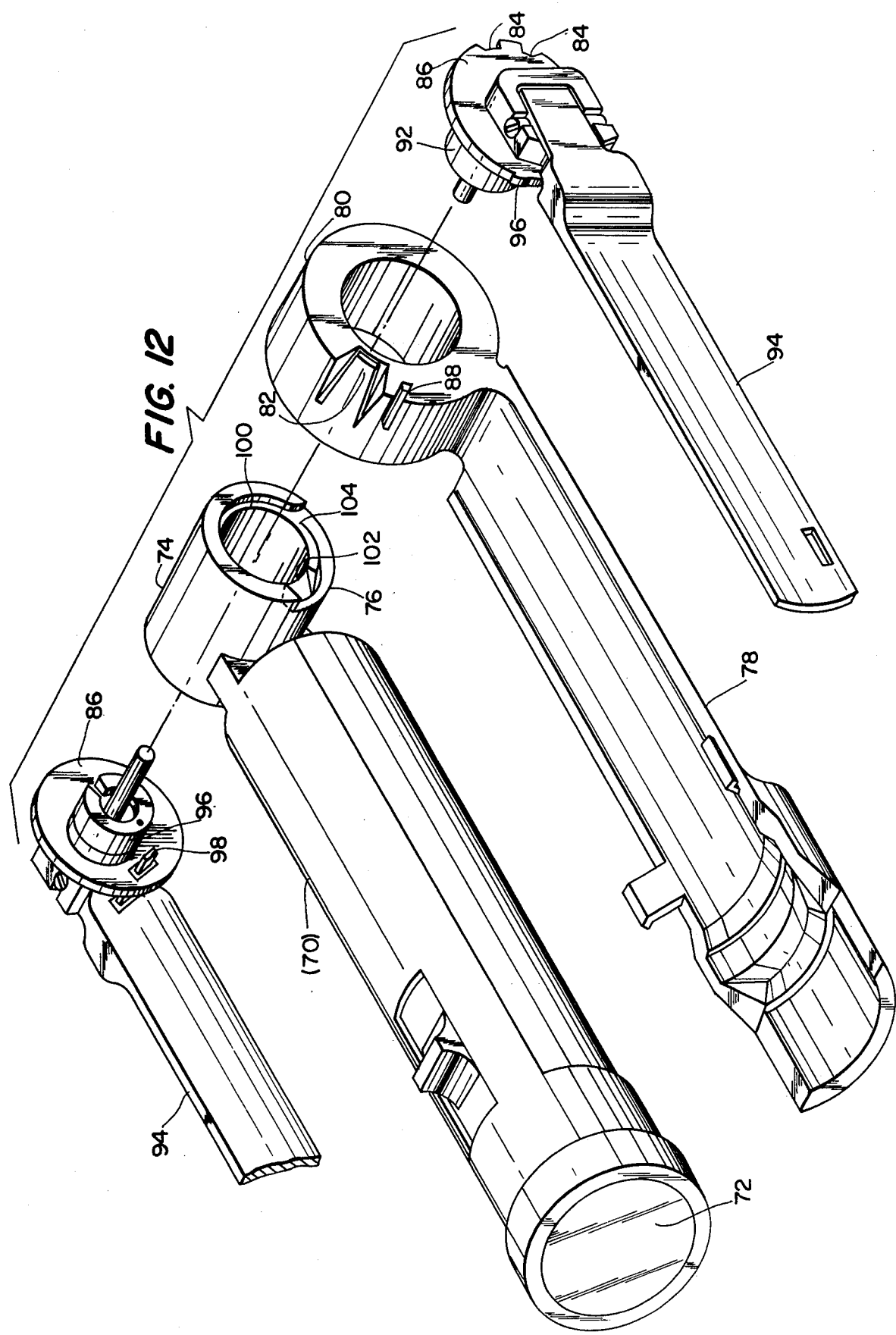

DEVICE HOLDER

BACKGROUND OF INVENTION

This invention relates to device holders. More particularly, this invention relates to illumination device holders and devices which serve to allow an illumination device to be directed in particular fashion so as to allow illumination of particular areas. In particular, this invention relates to illumination device holders which allow the prepositioning of illuminators, so that the illuminator need not be hand held.

SUMMARY OF INVENTION

Basically, the instant invention involves an illumination device which comprises a barrel having a tubular, split, shaft housing, arranged generally perpendicular to the barrel, wherein said housing contains cam means, second level, gate and drop point; a bottom leg having a center shaft housing engaged concentrically with the housing, wherein said center shaft housing contains a bushing arm and a shaft mover for engagement with the center shaft; a center shaft having attached to either end leg receivers for engagement with side legs; and side legs having attached thereto supporting arms for engagement onto the cam means, second level, gate or drop point, wherein there is attached to said side legs a spring means for forcing the support arms into contact with the cam means, second level, gate or drop point, and wherein said bottom leg has a latching means near the end opposite from the end containing the center shaft housing, wherein said latching means engages latching means receivers in the side legs near the end of the side legs opposite from the end that is attached to the side leg receiver.

DETAILED DESCRIPTION OF DRAWINGS

FIG. 12 is a disassembled prospective view of an alternative form of the instant invention.

DETAILED DESCRIPTION OF INVENTION

The instant invention is termed a device holder, and basically, it may be used for holding any type of object which may be aimed in a particular direction or must be held in a certain position. For example, the device could be a portable fan, a water sprinkling device, or in the preferred embodiment, a lighting device, so that the device of the instant invention becomes a flashlight. For the remainder of the description herein, it will be assumed that the device of the instant invention is a flashlight. However, in accordance with the previous discussion, this is not a necessity.

Figure 1:
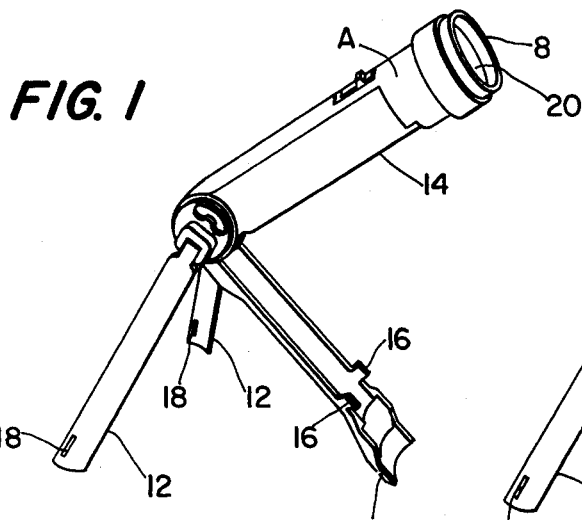
FIGS. 1 and 1a are prospective views of the device holder.
Figure 1A:
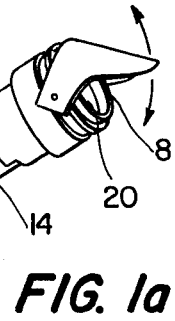
Figure 2A:
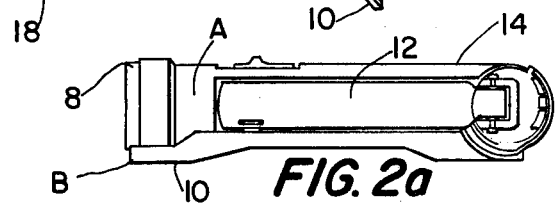
FIGS. 2a-2e are operational drawings showing various of the basic positions of the instant invention during use.
Figure 2B:
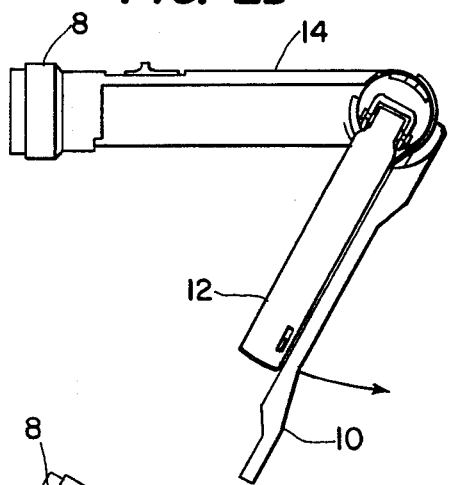
Figure 2C:
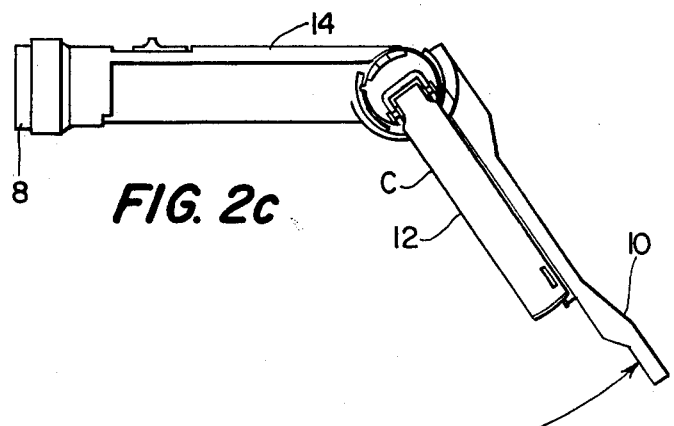
Figure 2D:
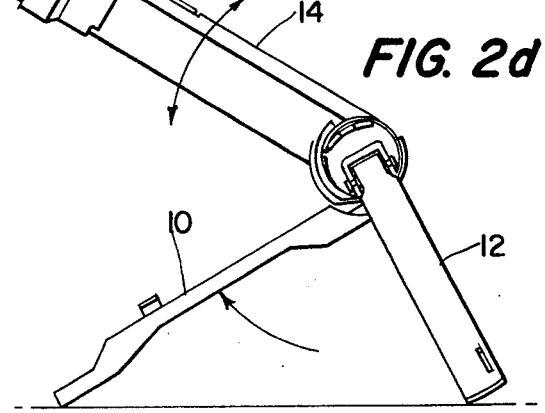
Figure 2E:
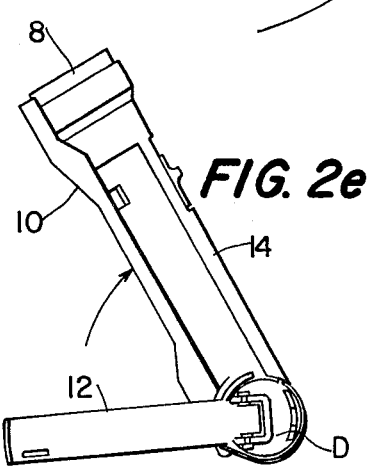

In actual operation, as shown in FIGS. 2a through 2e, the holder (8) is grasped by the user at or near point A. The bottom leg (10) which is at this time in the so-called rear detent position relative to the side legs (12) (FIG. 2a), is grasped near point B and pulled, causing the side legs (12) to rotate in the same direction as the bottom leg (FIG. 2b). As the bottom legs and side legs are rotated simultaneously, the side legs are displaced outwardly with respect to the barrel (14). During this operation the bottom leg latching means (16) is separated from each of its side leg latch receivers (18). The bottom leg is pulled back until the side legs have reached approximately position C (FIG. 2c). The bottom leg is then pulled back toward the barrel, until, in a preferred embodiment, a detent position is reached as the bottom leg is felt to snap into this position (FIG. 2d). Thus, by two simple movements of the bottom leg, a tripod configuration has been immediately established. The apparatus of the instant invention may of course be modified to provide various detent positions along the various points of rotation of the bottom leg. With one detent position a nominal tripod is established, allowing a quick establishment of the tripod most often utilized involving the bottom leg and the side legs.

The device may be adjusted with respect to the bottom and side legs after the detent position has been reached by grasping either side leg with one hand and revolving the barrel with respect to the now stationary legs into the desired position. Rotation of the barrel with respect to the bottom leg may occur over approximately a 120° range. During operation it is not necessary to return the legs to their starting position in order to readjust the position of the barrel with respect to the legs or to change the area of illumination in the case of a flashlight. Rather, the barrel may simply be rotated to any desired position.

This arrangement provides one of the outstanding features of the instant invention. The device may be assembled on irregular terrain and still work satisfactorily. Basically, all that is needed is three isolated points on which to place the bottom and side legs. A flat surface of any type is not required. Thus, the instant device may be placed, for example, inside an automobile hood with one leg on the engine and one leg on the distributor and another leg on the carburetor. Furthermore, on extremely sloped or steep surfaces, or on surfaces containing extreme irregularities, a very stable tripod configuration can be established by pulling the bottom leg far beyond the detent position, closer to the barrel, thus, greatly increasing its distance from the ends of the side legs, lowering the center of gravity of the device holder. The ability of the bottom leg to rotate past the detent position provides a means of preventing breakage of the mechanism in case the device is formed down, dropped, etc.

In more confined spaces, the barrel may be aimed without the use of the bottom leg. Here, the device is opened as previously set forth, and then the bottom leg is returned to a closed position alongside the barrel (See FIG. 2e). The side legs are then adjusted to a position of about 90° or less with respect to the barrel. The barrel may be further adjusted from practically about 0° of elevation up to about 90° of elevation by simply rotating the barrel with respect to the side legs. This configuration is also very stable because of its low center of gravity.

In order to collapse the legs on the device for storage, two methods may be employed. In the first, which is used when the bottom leg has already been collapsed into contact with the barrel, the device is simply grasped at point D, and the side legs are rotated to a fully "closed" position with respect to the barrel. When this point is reached, the side legs snap back into contact with the barrel. Preferably, however, even where the device is utilized without the bottom leg behind deployed, collapsing the side legs is made easier by deploying the bottom leg as set out below in the second method.

In the second method, where the bottom leg has been deployed, the leg is rotated to the rear detent position which is the point where the bottom leg shaft mover contacts the center shaft mover receiver and the device is grasped at point (D) and rotated to a closed position. As the side legs collapse against the barrel, the side leg latch receiver is also engaged with the bottom leg latch, thereby locking the bottom leg into place against the barrel whenever the side legs are held firm against the barrel. It is always easier to collapse the legs on the device for storage by first rotating the bottom leg to the rear detent position (FIG. 2c), than to rotate all three legs while in any other relative position. The reason for this is that under the former conditions, there will be no relative movement between the side legs and the bottom leg. Where relative movement does occur, additional friction is caused by the bottom leg bushing against the center shaft.

By utilizing the device as described above, it is possible to illuminate nearly any desired area. Illumination may be carried out both in an elevated mode when all three legs are extended in the nominal detent tripod configuration, and in a lower mode when only the side legs are extended. It is also possible to use the illumination device when all three legs are extended in a configuration on either side of the nominal detent position.

The first key group of elements in the instant invention includes a barrel, which under normal operation would on one end have the illumination device (20), and on the other, a tubular, split, shaft housing (22) arranged generally perpendicular to the barrel. The housing is for receipt of the center shaft (24). The housing itself is arranged split with an open area at its center to allow receipt of the bottom leg center shaft housing (26), which acts cooperatively with a split shaft housing, so that together and in engagement the center shaft housing and the split shaft housing form a single housing for the center shaft. Of course, the center shaft housing is rotable and moveable with respect to the split shaft housing and the center shaft. Within either end of the split shaft housing is provided a cam means (28) generally concentric with the housing. This cam means provides in generally concentric fashion increased elevation from the center of the housing toward either end of the housing to the highest level of the cam means, which level is connected preferably inwardly through a gate (30) to a preferably elevated, generally concentric second level (32). Furthermore, although it is preferred to have the second level attached through a gate from the highest level of the cam means, the gate, highest level of the cam means, and drop point (34) may be dispensed with and a single cam path consisting of a generally circular inclined plane connecting the lowermost point to the second level, may be employed in such a fashion that the support arm (36) traverses the cam path as the legs (12) are spread and the shaft (24) rotated, and then when the shaft is re-rotated in the opposite direction, the support arm, and consequently the side legs, retrace the same path. The second level is likewise generally concentric with the cam means, and as the second level is followed generally concentrically to the point which is directly above from the lowest elevation on the cam means, a drop point (34) is provided in the second level, allowing return to the lowest part of the cam. Although the drawing of the second level is shown to be inside relative to the center of the split shaft housing, this is not absolutely necessary, and the second level could be outside of the cam means, in which case the gate would operate in an outward fashion. Furthermore, in the drawings the cam means and the second level are shown concentric to the midpoint of the split shaft housing. This is also not necessary, the only requirement being that the second level, cam means, gate and drop point be so configured that the support arm can maintain contact, and that once attained, the second level elevation be maintained until the drop point is reached.

In the preferred operation, the cam means and the second level are both provided with generally concentric ridges (38) so as to form a trough along the cam surface and that portion of the second level not adjacent to the cam means. The trough serves to keep the support arm from slipping outside the areas of travel along the cam surface and the second level, and also forces, or cams, the support arm through the gate. As the center shaft is rotated, the support arms move along the cam means in the trough to the second level, and along the second level trough in a similar manner in those areas where the second level is not directly adjacent to the cam means.

Figure 3:
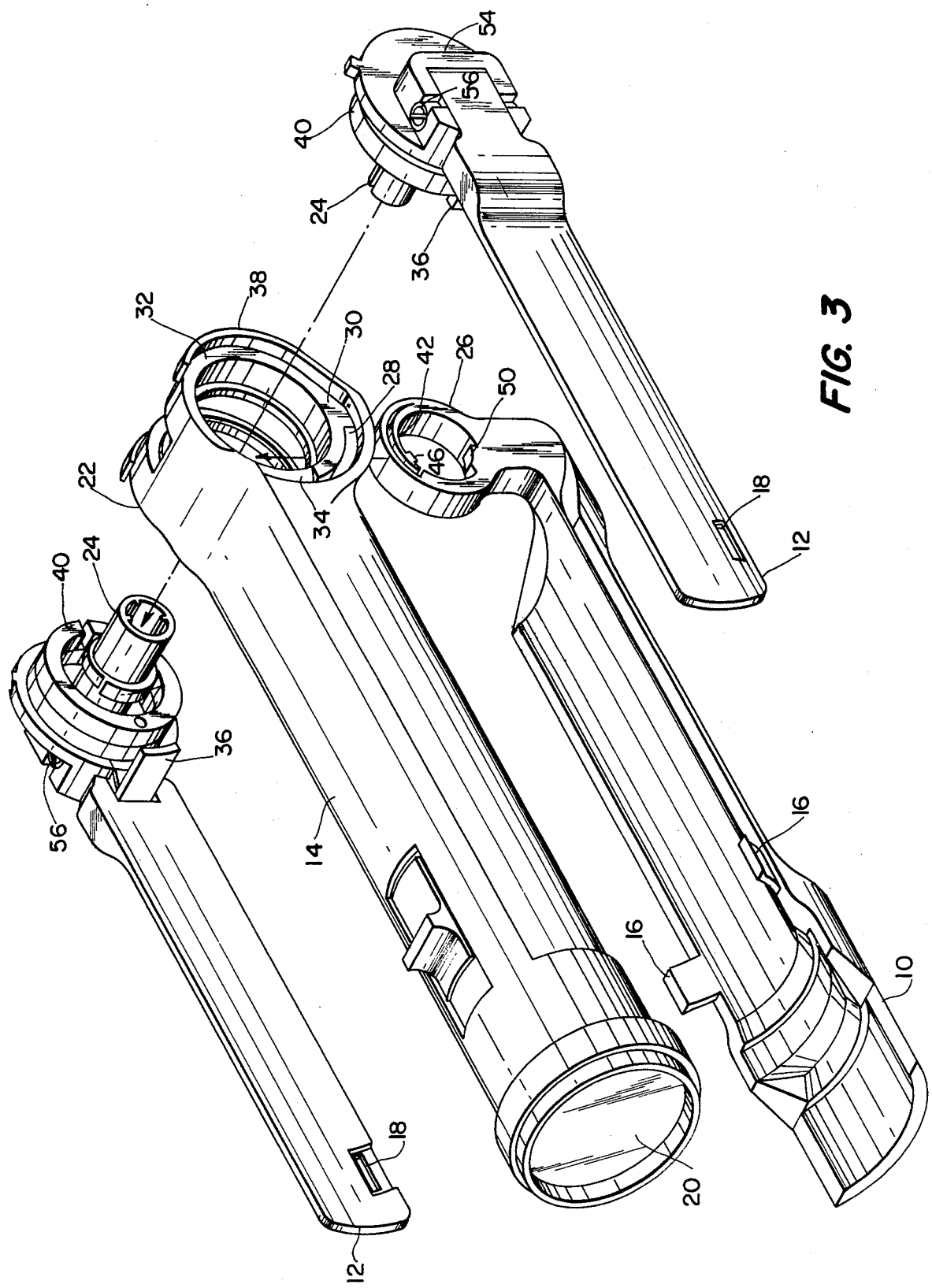
FIG. 3 is a disassembled prospective view of the invention showing how the major components fit together.
Figure 4:
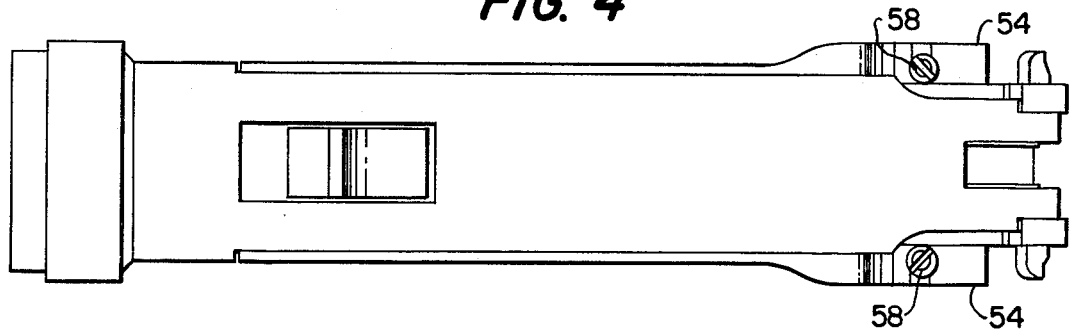
FIG. 4 is a top view showing the barrel and the split shaft housing.
Figure 5:
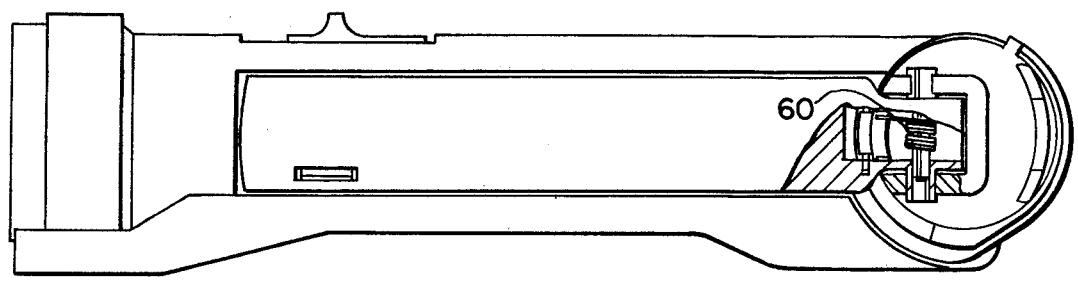
FIG. 5 is a side cut-away view showing the side legs.

The second main element group of the instant invention is the bottom leg group, which is comprised of the bottom leg (10) and the center shaft housing (26). Referring to FIG. 3, the bottom leg in the preferred instance contains near the end opposite from the center shaft a bottom leg latch means (16) for engagement with a side leg latch receiver on each of the side legs. In a preferred arrangement of the latch means (16) and latch receiver (18), the bottom leg latch means is a protruding member and the side leg latch receiver is an indentation or hole for reception of the protruding member. When the protrusion is in place in the receiver, bottom leg (10) movement is prevented if side leg (12) movement is restricted. In the event such a latch were not included, damage to the mover or other parts might occur if the side legs were inadvertently held firmly against the side of the barrel while the bottom leg moved. The bottom leg itself is elongated as far as is necessary to provide a stable tripod configuration when acting together with the side legs. All the legs are shaped so that when closed they conform to the shape of the barrel and form a unitary construction which results only in a slight increase in the barrel diameter.

The center shaft housing (26) engages in the split area of the split shaft housing (22) concentrically with the split area of the housing, so that it acts as a bushing along with the rest of the area of the split shaft housing for the center shaft (24), to be described later. Within the center shaft housing bushing is a bushing arm (42) which is forced into a position placing pressure on the center shaft making rotation more difficult, and when the center shaft is engaged within the bushing, the bushing arm is forced into contact with the center shaft. Attached to the bushing arm in the preferred instance, is a surface protrusion or contact surface (46) for engagement into a corresponding receiving area (48) on the center shaft. When the center shaft receiver is rotated so that the receiving area of the bushing arm is in contact with the contact protrusion on the bushing arm, a "detent" position is achieved serving to make more difficult the rotation of the center shaft (and thereby the side legs attached to it). This acts to hold the side legs into a particular desired position with respect to the bottom leg. Thus, the detent position provides the maximum resistance to any relative movement between the center shaft and the bottom leg. However, when any other point other than the detent is contacted by the bushing arm on the center shaft, enough force is exerted by the bushing arm against the center shaft to provide sufficient friction to hold the bottom leg and center shaft in that position. Generally, the detent point will be arranged so that the bottom leg is at about an 80°-120° angle with respect to the plane formed by the side legs.

Within the bushing of the center shaft housing is provided a mover (50) or a protrusion on the bushing wall which protrusion normally rotates over the outer surface of the center shaft. However, whenever the side legs and the bottom legs are in contact, i.e., in the closed position, the rotational position of the center shaft relative to the center shaft housing is such that the mover is in direct contact with the corresponding shaft mover receiver (52) on the center shaft. (This is the rear detent position) Therefore, any rotation of the bottom leg results in an equal rotation of the center shaft and also the side legs. Thus, the bottom leg may be rotated, for example, 90°, and the center shaft will likewise be rotated 90° to the 90° "open" position. Counter rotation of the bottom leg will leave the center shaft in the 90° position relative to the barrel, with the shaft mover moving freely over the center shaft.

The center shaft is the next main element of the instant invention. The center shaft (24) is inserted through the tubular split shaft housing (22) and the center shaft housing (26). The center shaft itself has a diameter sufficient to allow its insertion into the center shaft housing, but not sufficiently small so that unfettered rotation within the housing is allowed. Rotation may be limited by frictional rings (40) (or other similar device) to make rotation of the center shaft with respect to the split shaft housing more difficult.

The center shaft is provided with a shaft mover receiver (52) which, as previously described, causes rotation of the shaft when the bottom leg is rotated in a direction that engages the center shaft housing mover and the center shaft mover receiver. Also provided on the center shaft is the receiver (48) for the contact surface (46) on the bushing arm (42). Thus, when the bushing arm contact surface is brought into contact with the receiver area, a detent or hold position is provided, making more difficult rotation of the center shaft with respect to the bottom leg. However, regardless of the position of the bushing arm relative to the center shaft, and regardless of whether the bushing arm is in fact in the detent position, sufficient pressure is provided by the bushing arm to forestall movement of the center shaft relative to the arm, thus allowing the use of other tripod configurations other than the preferred configuration of the detent position.

Attached to either end of the center shaft are leg receivers (54) for engagement with the side legs. Reception of the side legs (12) may be done by any one of a number of methods. However, in any event, the side legs should be positioned with respect to the center shaft (24) so that about up to 45° of motion with respect to the plane established by a center longitudinal line of the bottom leg when being rotated. In other words, rotable movement is required. The degree of angular separation of the side legs from the barrel (14) must in any event be sufficient to provide a stable base for the tripod configuration. The side leg attachment may be most commonly provided by inserting a shaft (56) into the side leg, and attached the shaft to the receiver (54) on either side of the center shaft, thus allowing partial rotable movement of the side legs with respect to the leg receivers. The attachment shaft (56) may be split at either end allowing compression for insertion into the receiver. After insertion, the split ends (58) return to their normal configuration. This arrangement also provides means by which the side leg will slip out of contact with the receiver if an unusual amount of torque is provided to prevent breaking. The side leg is spring loaded by a spring means (60) or attached by suitable means acting to force the legs to the most closed position.

Figure 6A:
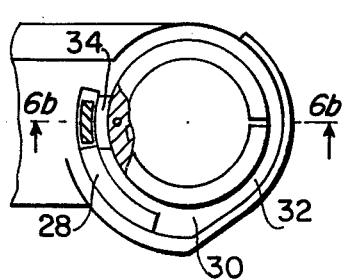
FIGS. 6a, 6b, 7a, 7b, 8a and 8b are various positions of a side leg as the leg is rotated with respect to the housing.
Figure 7A:
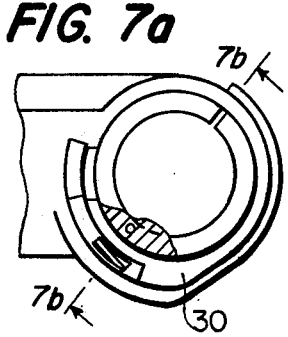
Figure 8A:
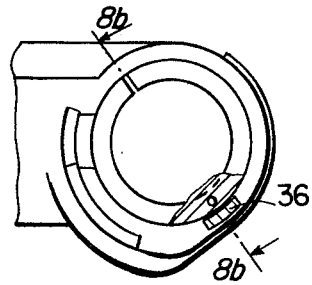
Figure 6B:
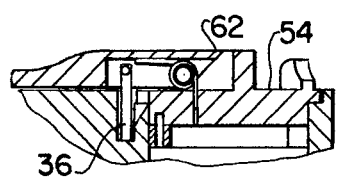
Figure 7B:
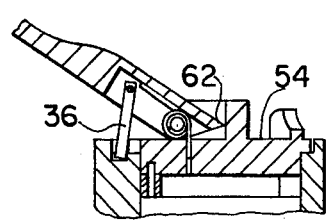
Figure 8B:
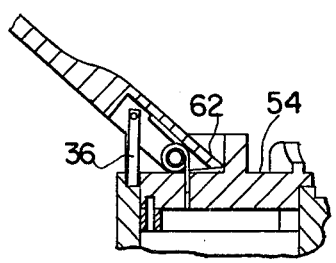
Figure 9:
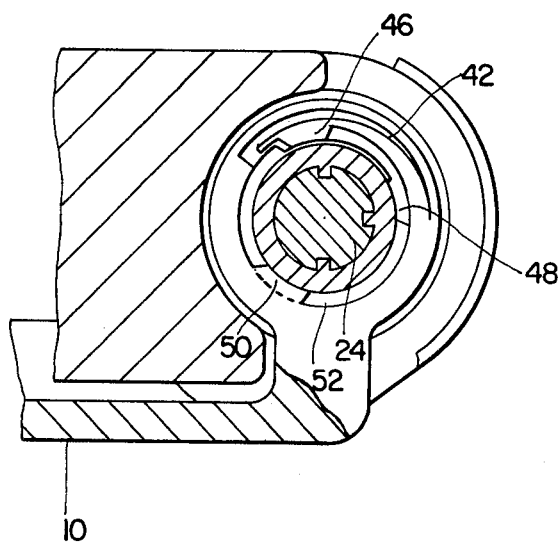
FIGS. 9, 10 and 11 are exploded cut-away views of the bottom leg showing the relationship of the bottom leg and the center shaft housing at various rotational points.
Figure 10:
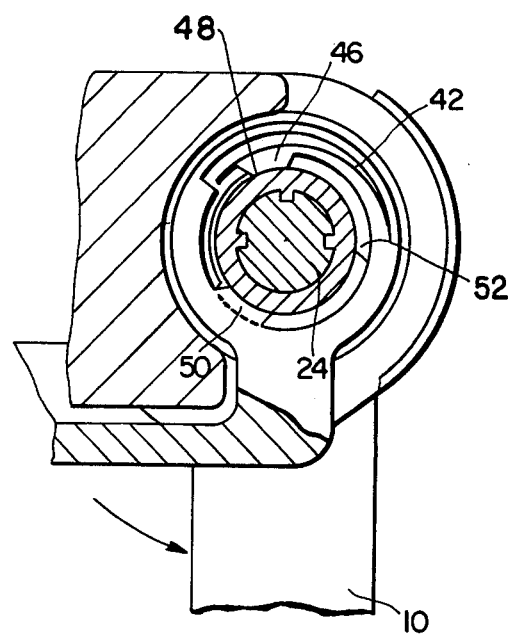
Figure 11:
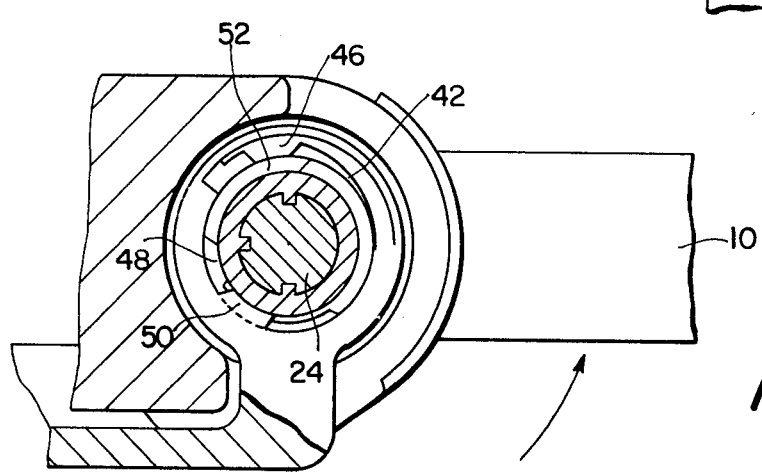

The legs are provided with supporting arms (36) which are rotable on the side legs to the extent necessary to allow free movement along the cam, second level, etc., with the side leg in its various positions. The supporting arm is in most cases inserted through an opening in the leg receiver into contact with the cam means and second level previously described. The support arm, when the device is in its closed position and the legs nearest the sides of the barrel, is in the lowermost point on the cam. (See FIGS. 6a and 6b) As the center shaft is rotated, the support arms travels up the cam to about the same elevation on the second level. (See FIGS. 7a and 7b) The support arm is then forced through a gate into the second level as rotation of the side legs is carried out. At this point, the support arm is at its maximum degree of elevation (See FIGS. 8a and 8b). Further rotation of the center shaft in either direction keeps the side arms in their maximum open position (and the side legs in their maximum degree of spread) until they are rotated along the second level to the drop point, at which time, the support arms drop back to the lowest possible position on the cam and the side legs snap to a closed position. This configuration allows the use of the side legs alone for support after the bottom leg has been snapped to its closed position, providing for the use of the device in a nearly flat position, and at the same time maintaining the side legs at their maximum spread for good stability.

Depending upon the position of the support arm, the spring in the side legs acts to keep the support arm in constant contact with either the second level, drop point, gate or cam. The legs are also provided with side leg stops (62) in the preferred instance, to limit the open movement of the side leg.

In an alternative arrangement of the instant device, as shown in FIG. 12, the barrel (70) is connected to the device (72) on one end, and on the other a tubular shaft housing (74) is provided, arranged generally perpendicular to the barrel. The housing is provided on either end with cam means (76) arranged in a generally concentric fashion with the housing, said cam means acting in the same fashion as the cam means previously described. The bottom leg (78), however, has an integral part of it, a center housing (80) which slips rotably over the shaft housing of the barrel. In the preferred instance, the shaft housing of the barrel is attached in offset fashion, as shown in FIG. 12, to the barrel, allowing for reception of the bottom leg center housing. The center housing itself is provided with an external detent arm (82) for engagement in a detent position or positions (84) on the side leg receiver (86) and is also provided with a shaft mover (88) for engagement with a receiver (90) which is provided on one of the side leg receivers. Thus, when the bottom leg (78) is rotated, the center shaft (92) is also rotated, which in turn rotates the side legs (94) and side leg receivers (86) attached to the other end of the center shaft. Like the previous arrangement, this alternative arrangement is also provided with a center shaft which is inserted through the tubular shaft housing and the center housing. The center shaft has no other purpose than to connect the two side leg receivers and may be provided with a friction means (96) to impede the free movement of the side legs with respect to the bottom leg. Finally, like the main design, the alternative design of the instant invention is provided with side legs having attached thereto partially movable supporting arms (98) inserted through the leg receivers (86) in a similar fashion as previously described. These supporting arms engage with the cam means (76), second level (100), drop point (102) and gate (104) in a like fashion, providing for rotation similar to the rotation provided for in the basic invention.

What is claimed is:

1. A device holder comprising:
    (a) a barrel connected to the device on one end, and on the other end a tubular, split, shaft housing, said housing arranged generally perpendicular to the barrel and having on either end cam means arranged generally concentric with the tubular housing, said cam means providing in generally concentric fashion increased elevation toward each end respectively of the housing to a higher level of cam means;
    (b) a bottom leg having a center shaft housing engaged concentrically with the split area of the tubular, split, shaft housing, and forming a bushing concentric with the center shaft housing and the tubular shaft housing, said bushing having a bushing arm forced into contact with the center shaft, providing increased friction against the rotation of the center shaft, and wherein said bushing has attached thereto a shaft mover for engagement with a center shaft;
    (c) a center shaft inserted through the tubular, split shaft housing and the center shaft bushing, wherein said center shaft has attached to either end leg receivers for engagement with side legs and a shaft mover receiver for receiving the shaft mover and a bushing arm receiver for receiving the bushing arm on the center shaft; and
    (d) side legs having attached thereto supporting arms that engage with the cam means, second level, drop point and gate, wherein said legs are attached to the leg receiver by engagement means providing for about 45 degrees of motion with respect to the leg receivers and spring means attached to the leg engagement means, said spring acting to keep the side legs forced toward the plane established by a center longitudinal line on the bottom leg as the bottom leg is rotated, and acting to keep the support arm in engagement with the cam means.

2. The device holder of claim 1 wherein said cam merges through a gate to an elevated, generally concentric second level, the second level being generally of the same level as said higher level and having a drop point leading to the lowermost level of the cam means away from each end of the housing.

3. The device holder of claim 1 wherein an illumination device is provided on the opposite end of the barrel from the tubular split shaft housing.

4. The device of claim 2 wherein a trough is provided along the cam means in those portions of the second level not concentric with the cam means, and also along the cam means.

5. The device of claim 1 wherein said center shaft is provided with friction means for increasing the difficulty of movement of the center shaft with respect to the tubular split shaft housing.

6. The device of claim 1 wherein the bottom leg is provided with a latch means and the side legs are provided with latch means receivers.

7. The device of claim 6 wherein the bottom leg latch means is a protrusion on the bottom leg and the side leg latch receiver is a protrusion receiver or notch for receiving the latch means.

8. A device holder comprising:
    (a) a barrel connected to the device on one end and on the other end a tubular, shaft housing, said housing arranged generally perpendicular to the barrel, and having on either end cam means arranged generally concentric with the housing, said cam means providing in generally concentric fashion increased elevation toward each end respectively of the housing to a higher level, and through a gate to a second level, wherein said second level has a drop point leading to the lowermost level of the cam means away from each end of the housing;
    (b) a bottom leg having a center housing mounted rotably over the shaft housing, wherein said center housing has an external detent arm for engagement in a detent position on the side leg receiver and a shaft mover for engagement with the mover receiver;
    (c) a center shaft inserted through the tubular shaft housing and the center housing, wherein said center shaft has side leg receivers for engagement with the side legs; and
    (d) side legs having attached thereto supporting arms that engage with the cam means, the second level, drop point and gate, wherein said legs are attached to the leg receiver by engagement means providing for about 45° of motion with respect to the leg receivers, and spring means attached to the leg engagement means wherein said spring acts to keep the side legs forced toward the plane established by a center longitudinal line on the bottom leg as the bottom leg is rotated, and act to keep the support arm in engagement with the cam means.

* * * * *